Nov. 24, 1936.  E. BENSHIMOL  2,062,157
BEAM COMPASS
Filed Dec. 12, 1934
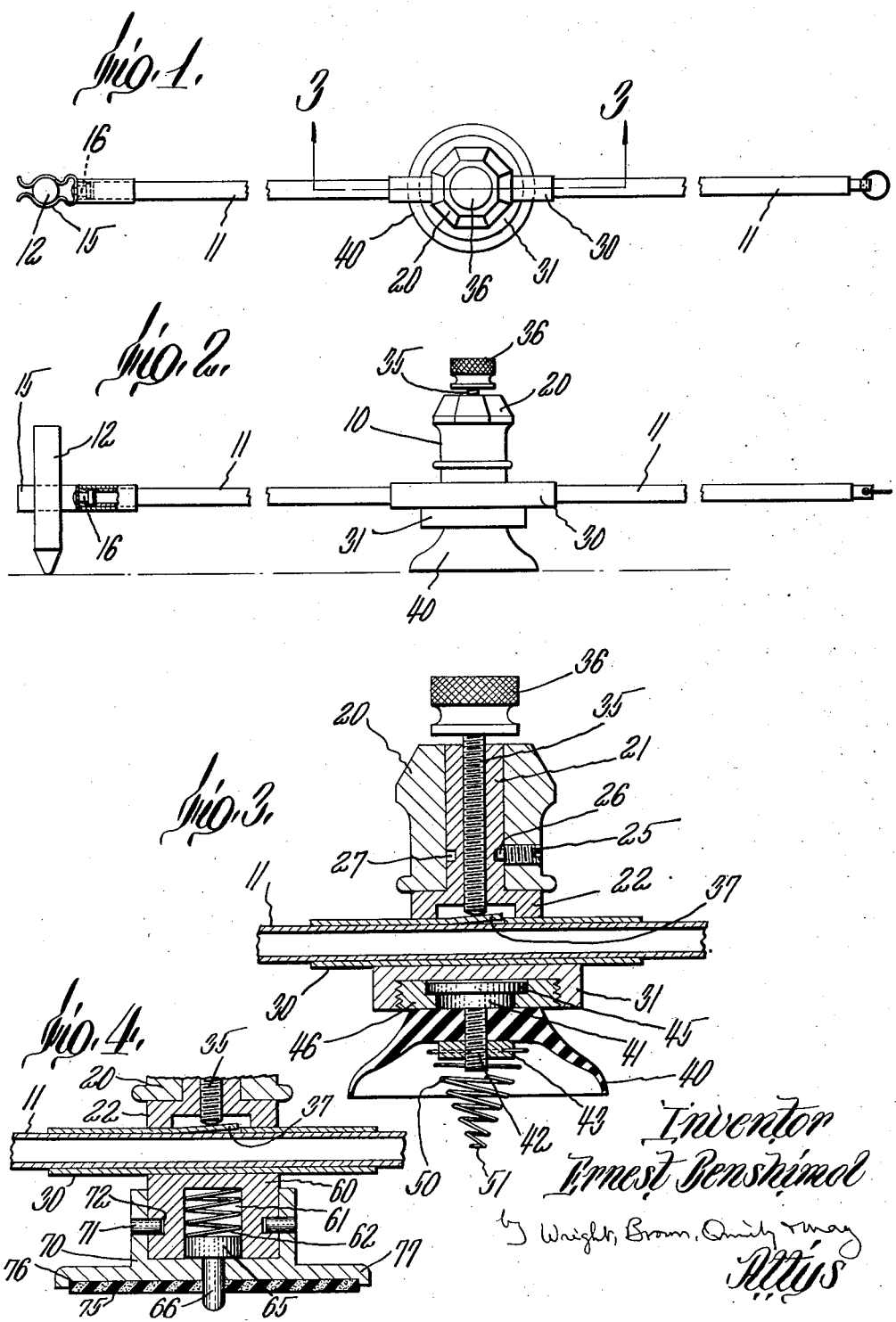

Patented Nov. 24, 1936

2,062,157

UNITED STATES PATENT OFFICE 2,062,157

BEAM COMPASS

Ernest Benshimol, Arlington, Mass.

Application December 12, 1934, Serial No. 757,186

1 Claim. (Cl. 33—27)

This invention relates to an improved beam compass, which, while capable of various uses, is more especially designed for class-room use in describing circles on a blackboard. It is an object of the invention to provide a compass which will be convenient to handle, easy to use, and accurate in performance.

For a more complete understanding of the details of the invention, reference may be had to the description of an embodiment thereof which follows, and to the illustration thereof on the drawing of which Figure 1 is a plan view of a beam compass embodying the invention.

Figure 2 is an elevation of the same.

Figure 3, on a larger scale, is taken on the line 3—3 of Figure 1.

Figure 4 is a fragmentary sectional view of a modified form of the invention.

The compass consists essentially of a pivot 10 and a beam arm 11 which is adjustable with respect to the pivot member and which carries in an end thereof a marking element 12 such as a piece of blackboard crayon. The beam 11 may be of any suitable shape or material. In the embodiment illustrated, it is of hollow construction with a square cross section. The beam may be marked in any suitable manner with scale divisions or the like so as to facilitate adjusting the compass to describe circles of any desired diameter within the limits of its capacity. At one end of the beam 11 is a crayon holder 15, this holder consisting of a pair of resilient arms shaped to receive and clamp a piece of crayon 12. The holder is swivelly mounted as by a pin or rivet 16 so that the crayon 12 can assume any angle with reference to the blackboard or surface to be marked. Thus the crayon can be adjusted in the holder 15 so as to engage the blackboard at an acute angle. This facilitates manipulation of the compass and tends to prevent breakage of the fragile crayon.

The pivot member 10 is shown in section in Figure 3. As indicated, this may include a finger-piece 20 on a spindle 21 which projects from a base 22 and on which the finger-piece 20 is freely rotatable. The finger-piece or knob 20 is retained on the spindle 21 as by a screw 25 having an end portion 26 projecting into a peripheral groove 27 in the spindle 21. The beam 11 is slidable in a short sleeve or holder 30 which is preferably of square cross-section so that the beam fits therein. The base 22 of the spindle 21 is attached by soldering, brazing or otherwise, to the upper face of the sleeve 30. A disk 31 is similarly secured to the lower face of the sleeve 30. In order to clamp the beam 11 adjustably, with reference to the pivot member 10, the spindle 21 is provided with a threaded bore in which is a screw 35 having a knurled head 36. In the upper face of the sleeve 30 a suitable flap 37 is cut out and bent up as indicated in Figure 3. When the screw 35 is screwed down, its lower end engages the flap 37 and presses it against the upper surface of the beam 11, thus clamping the beam in adjusted position.

To the disk 31 is swively attached a cupping device for engaging the surface on which the instrument is to be used. This device may comprise a rubber cup 40 which may be secured to a disk 41 as by a bolt 42 and nut 43. The disk 41 has a flange 45 which is engaged by an interior shoulder on a ring 46. This ring is screw-threaded into a depression in the bottom of the disk 31 to secure the cup 40 thereto. The disk 41 and its flange 45 fit loosely within the ring 46 so that the disk 31 is freely rotatable with reference to the cup 40. Thus the instrument may be held firmly against a blackboard or other surface to be marked, the operator grasping the finger-piece 20 and pressing the rubber cup 40 against the blackboard. Since the sleeve 30 and the beam 11 are freely rotatable with reference to the finger-piece 20 and the cup 30, circles may be readily described while the instrument is thus held.

It is often desirable to strike a circle with reference to some definite point as a center. In order to facilitate the proper location of the instrument with reference to such point, I may provide an indicator or centering element such as illustrated in Figure 3. As shown, this consists of a spiral coil 50 of spring wire, one end of which is permanently secured to the nut 43, the other end being bent into the form of a small eye 51. In using the instrument to strike a circle about a defined point, the eye 51 is centered with reference to such point and then the cup 40 is pressed against the surface of the blackboard, whereupon the beam is ready to be swung around its pivot to describe the circle.

In Figure 4 is illustrated another form of pivot structure which can be secured to the under side of the sleeve 31. As shown, this structure may comprise a cylinder 60 soldered or otherwise attached to the sleeve 30. This cylinder has a central bore or bottom recess 61 in which is seated a spring 62. A plunger 65 is slidable in the bore 61 against an end of the spring 62, the plunger having a reduced portion 66 which projects through the center of a cup-shaped pedestal 70 which fits loosely over the cylinder 60 so as to be freely rotatable thereon. The pedestal 70 may be held in place by any suitable means such as one or more pins 71 projecting through its side wall into a peripheral groove 72 in the outer surface of the cylinder 60. To the bottom of the pedestal 70 is attached by cement or otherwise a pad 75 of rubber or other non-slip material, a shallow recess 76 being provided, if desired, in the bottom of the pedestal 70 to receive the pad 75. The bottom of the pedestal 70 may also be flanged as at 77 to receive a larger pad 75. The reduced portion 66 of the plunger 65 projects through and beyond the pad 75 to serve as a center indicator for circles to be described by the compass. In practice, the projecting end of the plunger 66 is placed at a point on the blackboard which is to be the center of the circle described. Then the pad 75 is pressed against the blackboard to hold the pedestal from slipping while the circle is being described on the board, the plunger being pressed inward against the spring 62. The beams swing freely with respect to the handle 20 and the pedestal.

It is evident that various modifications and changes may be made in the details of structure herein described without departing from the spirit or scope of the invention as set forth in the following claim.

I claim:—

A beam compass comprising a base with a friction surface adapted to be pressed against a surface to be operated on, a rotatable spindle projecting from said base at right angles to said friction surface, a hollow sleeve extending through said spindle parallel to said friction surface, a screw threaded lengthwise through said spindle to bear against a portion of said sleeve, a beam slidable in said sleeve, a finger piece on the outer end of said screw operable to bind said portion of the sleeve against said beam, and a hollow knob rotatably surrounding said spindle.

ERNEST BENSHIMOL.